US006971970B2

(12) United States Patent
Inoue et al.

(10) Patent No.: US 6,971,970 B2
(45) Date of Patent: Dec. 6, 2005

(54) REGENERATION OF DIESEL PARTICULATE FILTER

(75) Inventors: Takao Inoue, Yokohama (JP); Munehiro Tabata, Isehara (JP); Junichi Kawashima, Yokosuka (JP); Naoya Tsutsumoto, Yokohama (JP); Makoto Otake, Yokohama (JP); Terunori Kondou, Yokohama (JP)

(73) Assignee: Nissan Motor Co., Ltd., Tokyo (JP)

( * ) Notice: Subject to any disclaimer, the term of this patent is extended or adjusted under 35 U.S.C. 154(b) by 31 days.

(21) Appl. No.: 10/752,427

(22) Filed: Jan. 7, 2004

(65) Prior Publication Data

US 2004/0204289 A1     Oct. 14, 2004

(30) Foreign Application Priority Data

Jan. 7, 2003     (JP)   ............................. 2003-001347

(51) Int. Cl.$^7$ ............................................ F16H 59/60
(52) U.S. Cl. ...................................................... 477/97
(58) Field of Search .......................................... 477/97

(56) References Cited

U.S. PATENT DOCUMENTS

| | | | |
|---|---|---|---|
| 5,439,424 A | 8/1995 | Sawada et al. | |
| 6,672,989 B2 * | 1/2004 | Murata et al. | 477/97 |
| 6,738,702 B2 * | 5/2004 | Kolmanovsky et al. | 701/54 |
| 6,866,610 B2 * | 3/2005 | Ito | 477/43 |

FOREIGN PATENT DOCUMENTS

| | | |
|---|---|---|
| EP | 1 382 812 A1 | 1/2004 |
| FR | 2 820 462 A1 | 8/2002 |
| JP | 10-073018 A | 3/1998 |
| WO | WO 01/53664 A2 | 7/2002 |

OTHER PUBLICATIONS

U.S. Appl. No. 10/756,502, filed Jan. 14, 2004, Kondou et al.
U.S. Appl. No. 10/752,518, filed Jan. 8, 2004, Koga et al.
U.S. Appl. No. 10/752,519, filed Jan. 8, 2004, Koga et al.
U.S. Appl. No. 10/755,316, filed Jan. 13, 2004, Otake et al.
U.S. Appl. No. 10/751,883, filed Jan. 7, 2004, Inoue et al.

* cited by examiner

Primary Examiner—Dirk Wright
(74) Attorney, Agent, or Firm—Foley & Lardner LLP

(57) ABSTRACT

A regeneration device for the diesel particulate filter (11) which traps particulates in exhaust gas discharged from a vehicle diesel engine (20) has a condition detecting sensor (12) which detects a condition of the diesel particulate filter, a vehicle speed sensor (27) which detects a vehicle speed, and a controller (40) which stores a map defining a predetermined running region of a diesel engine (20) in which regeneration of the filter (11) is possible. The controller (40) is programmed to modify the diesel engine running point to a running point which maintains the vehicle speed and lies within the predetermined running region. The controller (40) is further programmed to control the diesel engine to realize the engine rotation speed at the modified running point (D); set a target speed ratio of an automatic transmission (30) based on the maintained vehicle speed and the engine rotation speed (NeD) at the modified running point; and control the speed ratio of the automatic transmission to the target speed ratio.

15 Claims, 12 Drawing Sheets

REGENERATION OF DIESEL PARTICULATE FILTER

FIELD OF THE INVENTION

This invention relates to regeneration of a diesel particulate filter for trapping particulate matter in exhaust gas.

BACKGROUND OF THE INVENTION

If a diesel particulate filter (hereafter, "DPF") continues to trap particulate matter (hereafter, "PM"), it will clog. Tokkai Hei 10-73018, published by the Japanese Patent Office in 1998, discloses a "post-injection" which is a second fuel injection after the usual fuel injection, and an "injection timing retardation" which is a delay of the fuel injection timing as a method of raising exhaust gas temperature for regeneration of the DPF. "Post-injection" and "injection timing retardation" raise exhaust gas temperature to the self-ignition temperature of the PM, and burn the PM which is deposited in the DPF.

SUMMARY OF THE INVENTION

However, as the exhaust gas temperature is naturally low when engine power is low, it is difficult to raise exhaust gas temperature to the self-ignition temperature of the PM only by using "post-injection" or "injection timing retardation". Although the exhaust gas temperature can be increased by performing a "post-injection" with a large fuel injection amount, the increase in fuel injection amount causes poorer fuel consumption performance. As the increase in fuel injection amount increases engine torque, it is necessary to delay the "post-injection" timing. Due to the delay of the "post-injection" timing, fuel spray reaches the wall of the engine cylinder liner without being injected into the piston combustion chamber. As a result, fuel may adhere to the wall of the cylinder liner, and dilution of engine oil may occur.

It is therefore an object of this invention to regenerate a filter without worsening fuel consumption or diluting engine oil.

In order to achieve the above object, this invention provides a regeneration device for a diesel particulate filter which traps particulates in exhaust gas discharged from a vehicle diesel engine, wherein the diesel engine outputs an engine torque through an automatic transmission to drive wheels. The regeneration device comprises a condition detecting sensor which detects a condition of the diesel particulate filter and a controller. The controller stores a map defining a predetermined running region of a diesel engine in which self-ignition of trapped particulates is possible. The controller is programmed to determine whether or not regeneration of the filter is required based on the detected condition; modify a running point of the diesel engine to a point within the predetermined running region when the regeneration of the filter is required; set a target speed ratio of the automatic transmission based on an engine rotation speed at the modified running point; and control a speed ratio of the automatic transmission to the target speed ratio.

This invention further provides a regeneration method for regenerating a diesel particulate filter which traps particulates in exhaust gas discharged from a vehicle diesel engine, wherein the diesel engine outputs an engine torque through an automatic transmission to drive wheels. The regeneration method comprises the steps of storing a map defining a predetermined running region of a diesel engine in which self-ignition of trapped particulates is possible; detecting a condition of the diesel particulate filter; determining whether or not regeneration of the filter is required based on the detected condition; modifying a running point of the diesel engine to a point within the predetermined running region when the regeneration of the filter is required; setting a target speed ratio of the automatic transmission based on an engine rotation speed at the modified running point; and controlling a speed ratio of the automatic transmission to the target speed ratio.

The details as well as other features and advantages of this invention are set forth in the remainder of the specification and are shown in the accompanying drawings.

BRIEF DESCRIPTION OF THE DRAWINGS

FIG. 7 is a time chart describing DPF regeneration control and its effect according to a first embodiment.

FIG. 8 is a time chart describing DPF regeneration control and its effect according to a second embodiment.

FIG. 10 is a time chart describing DPF regeneration control and its effect according to a third embodiment.

DESCRIPTION OF THE PREFERRED EMBODIMENTS

Figure 1:
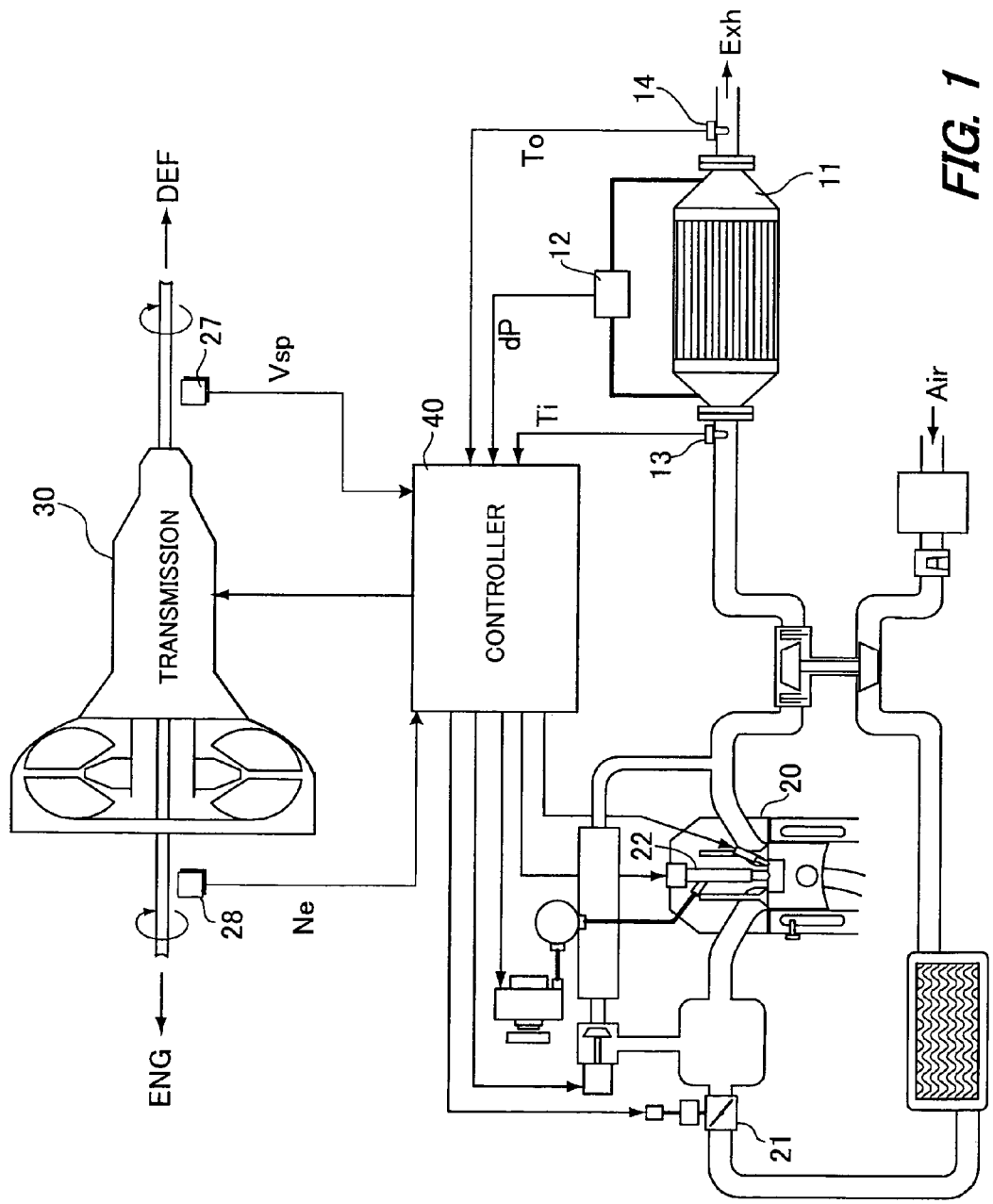
FIG. 1 is a schematic diagram of a vehicle provided with a diesel particulate filter and its regeneration device.

Referring to FIG. 1, a regeneration device for a diesel particulate filter according to this invention will now be described. The diesel particulate filter purifies the exhaust gas from a vehicle diesel engine.

A DPF regeneration device 10 for reproducing a DPF11 is provided with a controller 40, differential pressure sensor 12, vehicle speed sensor 27 that detects vehicle speed Vsp, engine speed sensor 28 that detects engine rotation speed Ne of a diesel engine 20, and a fuel injector 22 of the diesel engine 20. The controller 40 controls the diesel engine 20 and an automatic transmission 30, and thus varies the engine rotation speed and speed ratio. In this description, the speed ratio of the automatic transmission 30 means a speed reduction ratio, i.e. (input speed)/(output speed). The automatic transmission 30 is connected to the output shaft of the diesel engine 20, and the engine torque outputted from the diesel engine 20 is inputted into the automatic transmission 30. The automatic transmission 30 converts the engine torque from the diesel engine 20 into a drive torque, and the drive torque is transmitted to the drive wheels. The automatic transmission may be of the usual type, comprising a transmission mechanism comprising a torque converter, a planetary gear set and clutches, and control valves which change the path of the oil supplied to clutches. By controlling the control valves, the controller 40 changes over the clutch engaged to select a gear, and performs gear selection control. When the automatic transmission is a continuously variable transmission (CVT), the automatic transmission further comprises a pair of pulleys synchronized with a belt, and control valves which adjust the oil pressure supplied to the pulleys. A typical continuously variable transmission (CVT) is disclosed by U.S. Pat. No. 5,439,424 granted on Aug. 8, 1995 to Sawada et al.

The controller 40 controls the fuel injection timing of the fuel injector 22, and performs "post-injection" and "injection timing retardation" if required. A "post-injection" is another fuel injection following the usual main fuel injection, and it is performed additionally to the main fuel injection that is implemented at a point of time near the dead top center of the compression stroke of the diesel engine 20. Thus, the fuel injector 22 functions as an exhaust gas temperature adjustment mechanism which adjusts the exhaust gas temperature of the diesel engine 20. The controller 40 is provided with a microcomputer including a central processing unit (CPU) which executes programs, a read-only memory (ROM) which stores programs and data, a random access memory (RAM) which temporarily stores the computation result of the CPU and acquired data, and an input-output interface (I/O interface).

A DPF11 is a filter which traps particulate matter (PM) in the exhaust gas discharged from the diesel engine 20, for example, a ceramic porous filter. The DPF11 is installed in the exhaust system for the diesel engine 20. If the DPF11 continues to trap the PM, it will become clogged. Once PM accumulates to some extent, the exhaust gas temperature is increased by controlling the fuel injection of the fuel injector 22. This burns and removes the deposited PM, and regenerates the DPF. The regeneration characteristics of the DPF11 are described later.

The differential pressure sensor 12 is a pressure difference measurement means for detecting the differential pressure dP between the pressure on the inlet side and the outlet side of the DPF 11. The amount of trapped PM is estimated from the magnitude of the differential pressure, and thus the differential pressure sensor 12 assists the controller 40 in determining the regeneration timing of the DPF. The differential pressure sensor 12 outputs the detected differential pressure signal to the controller 40. The differential pressure sensor 12 is an example of the condition detecting sensor which detects a condition of the DPF11. When the condition of the DPF11 becomes a predetermined condition, the controller 40 determines that regeneration of DPF11 is required. For the differential pressure sensor 12, the condition of the DPF11 means the differential pressure and the predetermined condition corresponds to an experimentally predetermined value of the differential pressure.

The DPF inlet temperature sensor 13 is a temperature measurement means for detecting the inlet temperature Ti (i.e., the exhaust gas temperature of the diesel engine 20) of the DPF11, and outputs a signal indicative of the inlet temperature to the controller 40. A DPF outlet temperature sensor 14 is a temperature measurement means for detecting the outlet temperature To of the DPF11, and outputs an signal indicative of the outlet temperature to the controller 40. The vehicle speed sensor 27 is a vehicle speed (Vsp) measurement means, and may be a sensor which detects the rotation speed of the output shaft of the automatic transmission 30. The engine speed sensor 28 is an engine rotation speed (Ne) measurement means, and may be a sensor which detects the rotation speed of the output shaft of a diesel engine 20. The signals from the sensors 12–14 and 27–28 are inputted to the controller 40.

The controller 40 functions as a running point determining means. When the controller 40 determines that regeneration of the DPF11 is required, it determines whether or not the running point of the diesel engine 20 is in a temperature region in which self-ignition of particulates is possible. Here, "running point" is a set of engine rotation speed Ne and engine torque ETor (engine load) i.e., (Ne, ETor). When the running point of the diesel engine 20 is not in the region in which self-ignition of particulates is possible, the controller 40 sets a new running point while maintaining vehicle speed Vsp. Thus, it functions as a running point setting means of the diesel engine 20. The new running point is a running point at which hot exhaust gas can be discharged to raise the particulates to the self-ignition temperature, and the same vehicle speed is maintained at the new running point and the original running point. The controller 40 determines whether there is the new running point at which hot exhaust gas can be discharged to raise the particulates to self-ignition temperature.

When such a new running point exists, the controller 40 changes the speed ratio of the automatic transmission 30 so as to realize the set new running point. In other words, when it is determined that DPF regeneration is required, the controller 40 determines a target speed ratio based on the engine rotation speed corresponding to the new running point and the vehicle speed. In this way, the controller 40 further functions as a target speed ratio determination means. The controller 40 controls the automatic transmission 30 so that the target speed ratio is obtained. Thus, the controller 40 further functions as a speed ratio change means.

In order to attain the engine rotation speed corresponding to the new running point, the controller 40 controls a throttle valve 21 of the diesel engine 20, the fuel injector 22 of the diesel engine 20 and transmission 30, and changes the engine rotation speed. The controller 40 further controls the fuel injection timing and injection amount, and performs post-injection and injection timing retardation if required. The details of the control performed by the controller 40 will be described later.

Figure 2:
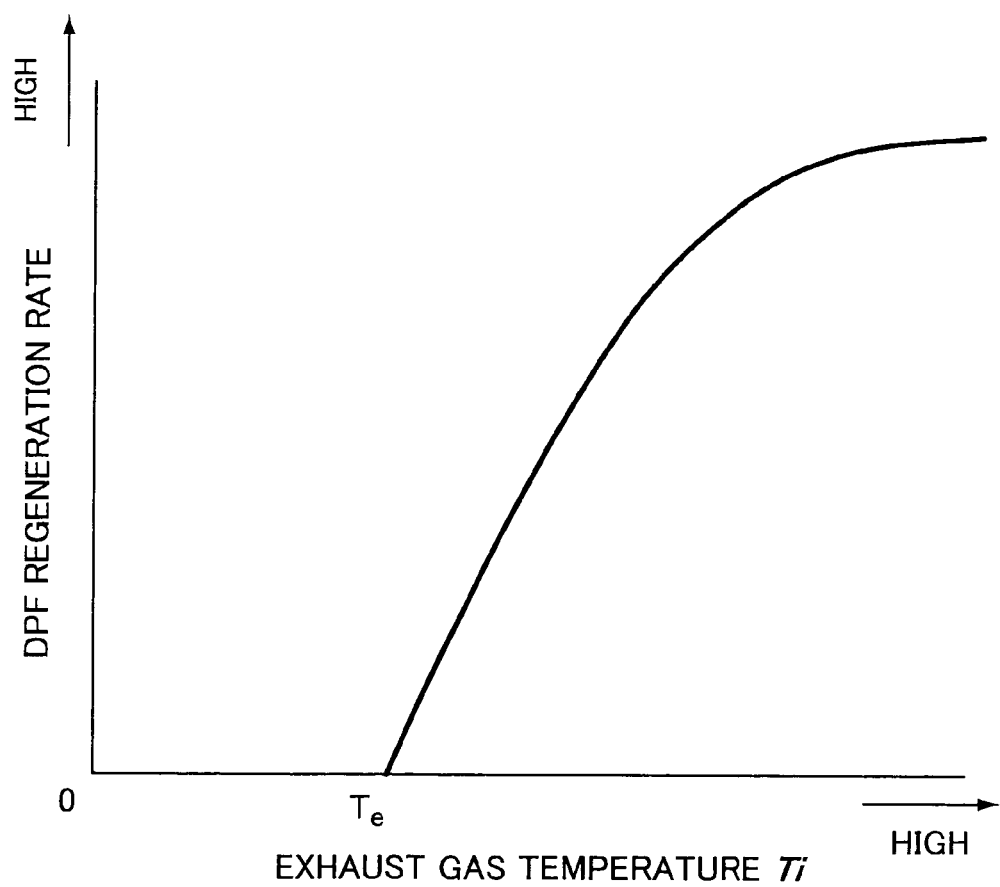
FIG. 2 is a graph showing the regeneration characteristics of the DPF and the regeneration rate of the DPF as a function of exhaust gas temperature.

FIG. 2 is a graph showing the regeneration characteristics of the DPF. Exhaust gas temperature is shown on the horizontal axis, and DPF regeneration rate is shown on the vertical axis. As shown in FIG. 2, when the exhaust gas temperature Ti is a low temperature, the DPF cannot be regenerated, but when the exhaust gas temperature is higher than a threshold temperature Te, the PM burns and the DPF can be regenerated. The DPF regeneration rate also increases with the rise of exhaust gas temperature. For example, the threshold temperature Te is 400 degrees C.

Figure 3:
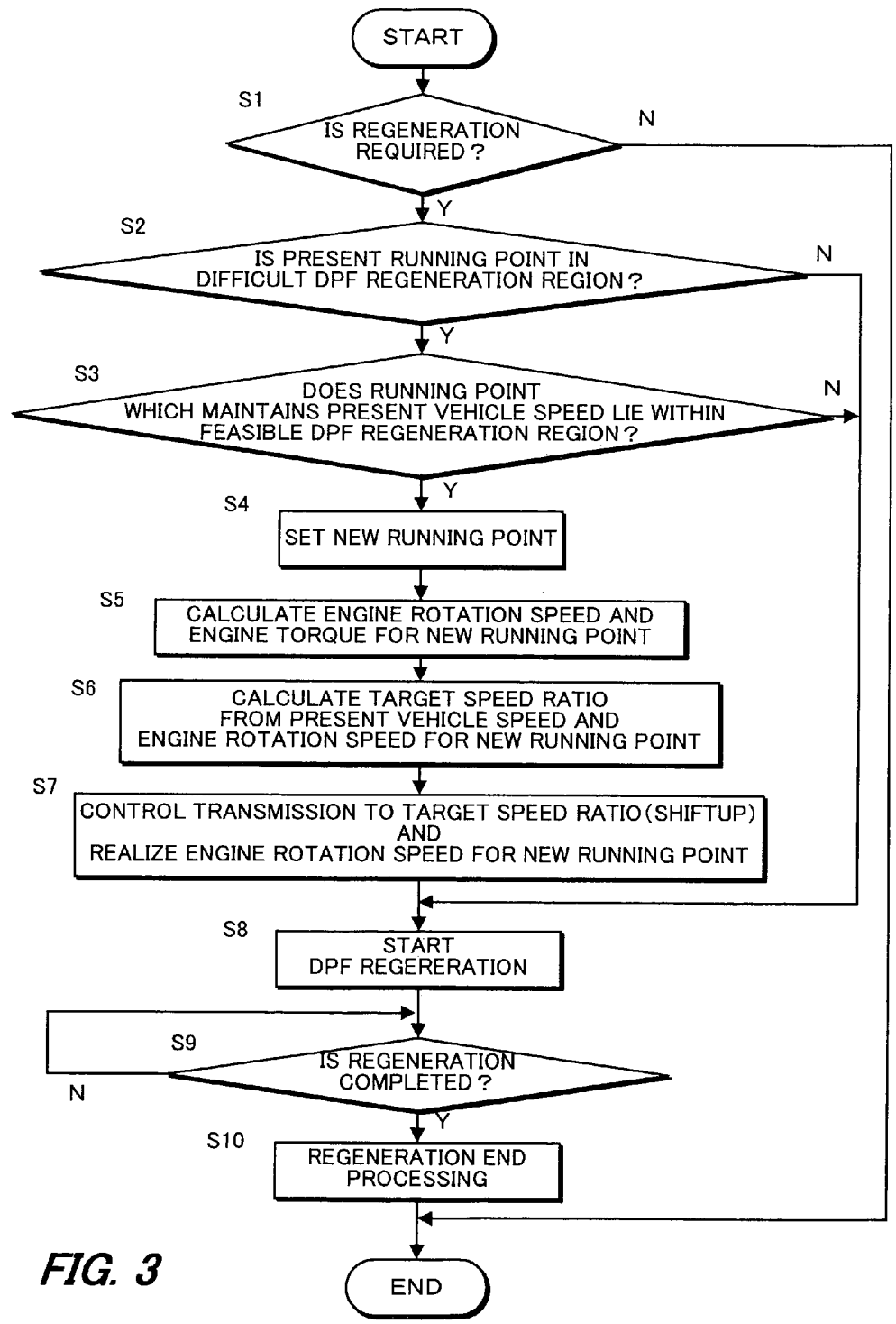
FIG. 3 is a flowchart describing a control routine relating to DPF regeneration executed by a controller.

Referring to FIG. 3–7, a first embodiment of regeneration control of the particulate filter will be described. In the first embodiment, the automatic transmission 30 is a continuously variable transmission (CVT). The control routine shown in the flowchart of FIG. 3 is implemented as a program executed by the controller 40. The control routine is basically repeatedly performed by interrupt processing every 10 milliseconds. However, interrupt is forbidden until the control routine is completed.

In a step S1, the controller 40 determines whether or not regeneration of the DPF11 is required. If regeneration is required, the routine proceeds to a step S2. If regeneration is unnecessary, the routine is terminated. The need for regeneration of the DPF is determined from the magnitude of the differential pressure dP at the inlet and outlet of the DPF detected by the differential pressure sensor 12. When the differential pressure is larger than a predetermined value due to clogging of the DPF (i.e. when the PM deposition amount exceeds a predetermined PM deposition amount that requires the start of regeneration), it is determined that regeneration of DPF is required. The predetermined value or the predetermined PM deposition amount is experimentally determined depending on the construction of the DPF.

Figure 4:
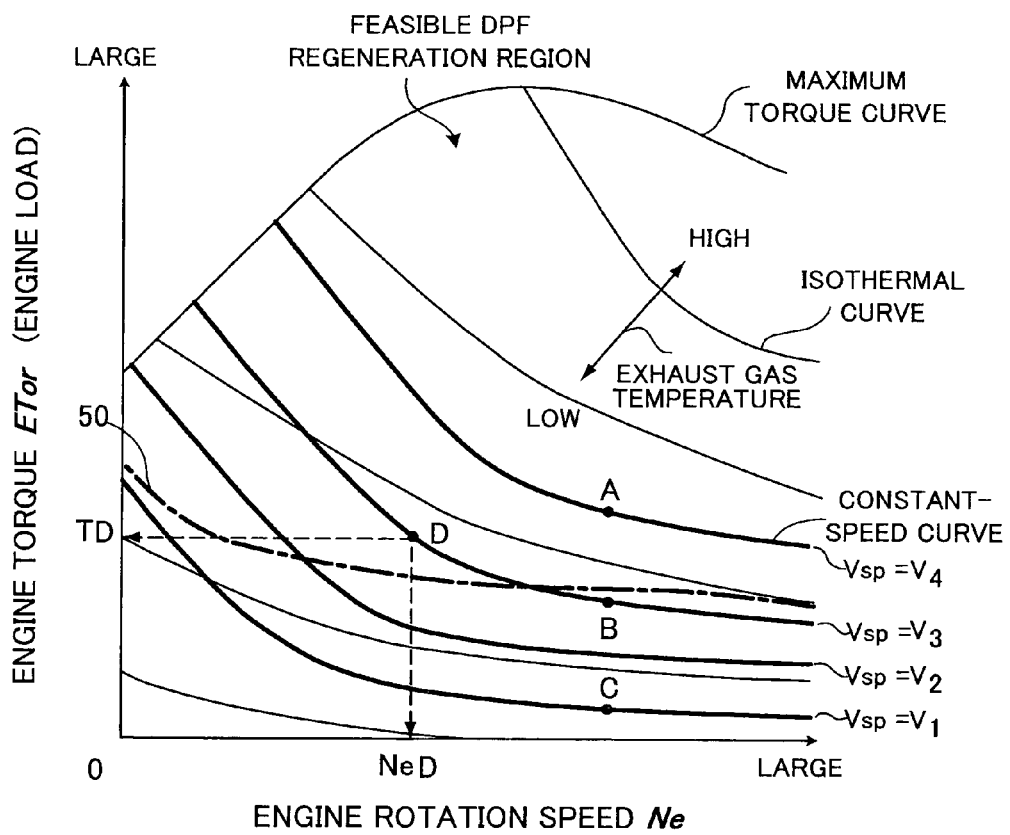
FIG. 4 is a map showing the running range of the diesel engine in which DPF regeneration is possible in a continuously variable transmission (CVT), and defines the relation between engine rotation speed and engine torque for every vehicle speed.

In the step S2, it is determined whether or not the present running point of the diesel engine 20 is in a running range where regeneration of the DPF is difficult. This determination is performed by looking up the map of FIG. 4. The map of FIG. 4 is stored in the ROM of the controller 40, and defines the relation between engine rotation speed and engine torque for every vehicle speed. FIG. 4 shows the running range in which DPF regeneration is possible within an engine rotation speed-engine torque plane. The engine rotation speed is shown on the horizontal axis, and engine torque (engine load) is shown on the vertical axis. The running range in which DPF regeneration is possible can be experimentally determined beforehand. The bold curves show isovalue curves for the vehicle speed Vsp. In other words, a constant vehicle speed can be maintained at all running points on each isovalue curve. In FIG. 4, exemplary isovalue curves (Vsp=V1, Vsp=V2, Vsp=V3, Vsp=V4) are shown, and here the vehicle speed increases towards the upper side of paper, namely V4>V3>V2>V1.

In FIG. 4, the dot-and-dash curve shows the boundary 50 of the running range in which the exhaust gas temperature Ti can reach a temperature higher than the threshold temperature Te. The engine running range above the boundary 50 is referred to as "feasible DPF regeneration region" in this description. In this engine running range, the exhaust gas temperature can rise to a temperature (higher than the threshold temperature Te) at which PM can burn by a suitable "post-injection" or suitable "injection timing retardation" which does not cause problems, such as fuel adhesion to the wall of the cylinder liner. The engine running range below the boundary 50 is an engine running range wherein even if "post-injection" and "injection timing retardation" are performed, DPF regeneration is difficult, because either PM cannot be burned or problems such as fuel adhesion to the wall of the cylinder liner arise. This range is referred to as "difficult DPF regeneration range" in this description. For example, the running point A in FIG. 4 is in the feasible DPF regeneration region, whereas the running points B and C are in the difficult DPF regeneration region.

The thin solid line is an isothermal curve for exhaust gas temperature. Specifically, using the isothermal exhaust gas temperature curve, the exhaust gas temperature is obtained from the engine rotation speed and engine torque. Upper curves show high temperatures and lower curves show low temperatures. In FIG. 4, the curve with a mountain-like shape is a maximum torque curve.

In a Step S2, it is determined whether or not the present running point is in the difficult DPF regeneration region by looking up the map of FIG. 4. The present vehicle speed Vsp is read from the vehicle speed sensor 27 and the present engine rotation speed Ne is read from the engine speed sensor 28. The present engine torque Etor is obtained from the present vehicle speed Vsp and the present engine rotation speed Ne by looking up the map of FIG. 4, whereby the present running point (Ne, ETor) of the diesel engine 20 is found. If the running point of the diesel engine 20 is not in the difficult DPF regeneration region (i.e., the running point is in the feasible DPF regeneration region), the routine proceeds to a Step S8, and if the running point of the diesel engine 20 is in the difficult DPF regeneration region, the routine proceeds to a Step S3.

In a step S3, the present vehicle speed is read by using the vehicle speed sensor 27, and then, referring to FIG. 4, it is determined whether or not the isovalue curve which maintains the present vehicle speed, passes through the feasible DPF regeneration region. Thus, a running point is searched which maintains the present vehicle speed and is suitable for DPF regeneration. For example, in the map of FIG. 4, although the running point B is not a suitable running point for DPF regeneration, as the isovalue curve (Vsp=V3) passes through the feasible DPF regeneration region, a suitable running point (e.g. point D) for DPF regeneration exists. In the map of FIG. 4, the running point C is not a suitable running point for DPF regeneration, and the isovalue curve (Vsp=V1) does not pass through the feasible DPF regeneration region. As a running point suitable for DPF regeneration does not exist when the isovalue curve for the present speed does not pass through the feasible DPF regeneration region, the routine proceeds to the Step S8. On the other hand, when the feasible DPF regeneration region includes the isovalue curve for the present speed, the routine proceeds to a Step S4 for changing running point.

In a step S4, the map of FIG. 4 is looked up and a new running point maintaining the present vehicle speed is set. Thus, a modification of the running point is performed. Hereafter, it is assumed that the present running point is the point B in FIG. 4. The present running point B is changed and a new running point D is set. From the viewpoint of preventing rapid change of engine rotation speed or engine torque, it is desirable to position the new running point D at the intersection of the isovalue curve for the present speed and the boundary 50. On the other hand, from the viewpoint of performing satisfactory DPF regeneration, it is desirable to position the new running point D away from the boundary 50. Therefore, the running point D is determined in consideration of both viewpoints. For example, the running point D may be separated from the intersection of isovalue curve for the present speed and the boundary 50 by only a predetermined distance.

In a step S5, the engine rotation speed NeD and engine torque TD for the new running point D are calculated from the map of FIG. 4.

Figure 5:
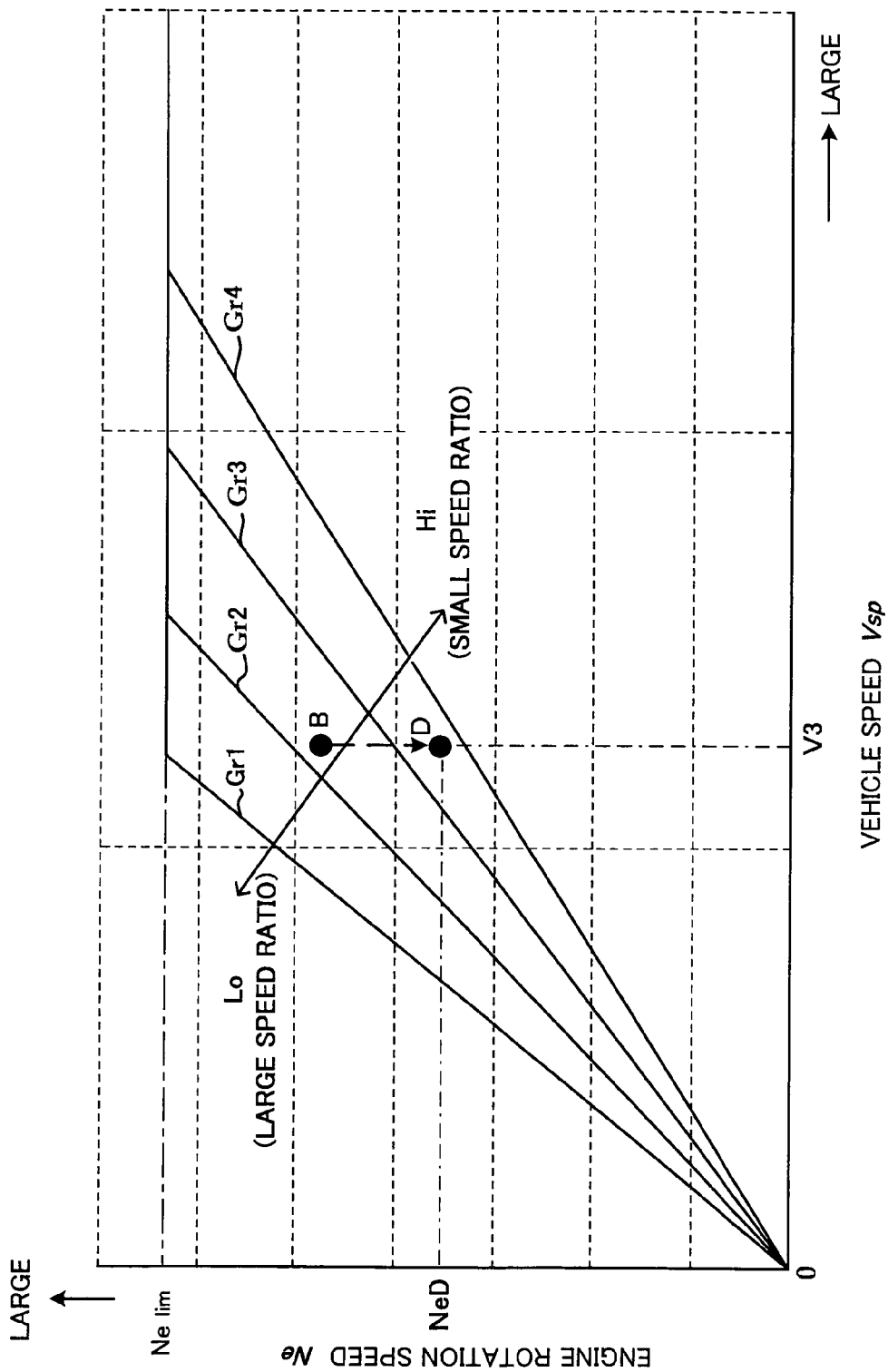
FIG. 5 is a shift map of a CVT.

In a step S6, a target speed ratio is calculated from a present vehicle speed V3 and engine rotation speed NeD for the new running point D. This may be calculated for example by looking up a shift map shown in FIG. 5 stored in a ROM. The lines in FIG. 5 show 1st–4th gear (Gr 1–4) of the manual mode of the CVT. The slope of the line on the Lo side (high speed ratio) is steep, and the slope of the line on the Hi side (low speed ratio) is gradual. The speed change of the CVT is performed by changing the ratio of the radii of the pair of pulleys.

In the Step S6, the target speed ratio for the vehicle speed Vsp and the engine rotation speed NeD of the running point D are calculated based on the shift map of FIG. 5.

In a step S7, a command signal to decrease the speed ratio (upshift) is sent to the automatic transmission 30 (CVT), and a command signal to lower the engine rotation speed is sent to the engine (throttle valve 21, fuel injector 22). In this way, the engine rotation speed NeD is realized and the speed ratio of the automatic transmission 30 is controlled to the target speed ratio.

In a step S8, regeneration of the DPF is started. In this embodiment, in order to raise the temperature of the DPF, the map of FIG. 6 is looked up and "post-injection" is performed.

Figure 6:
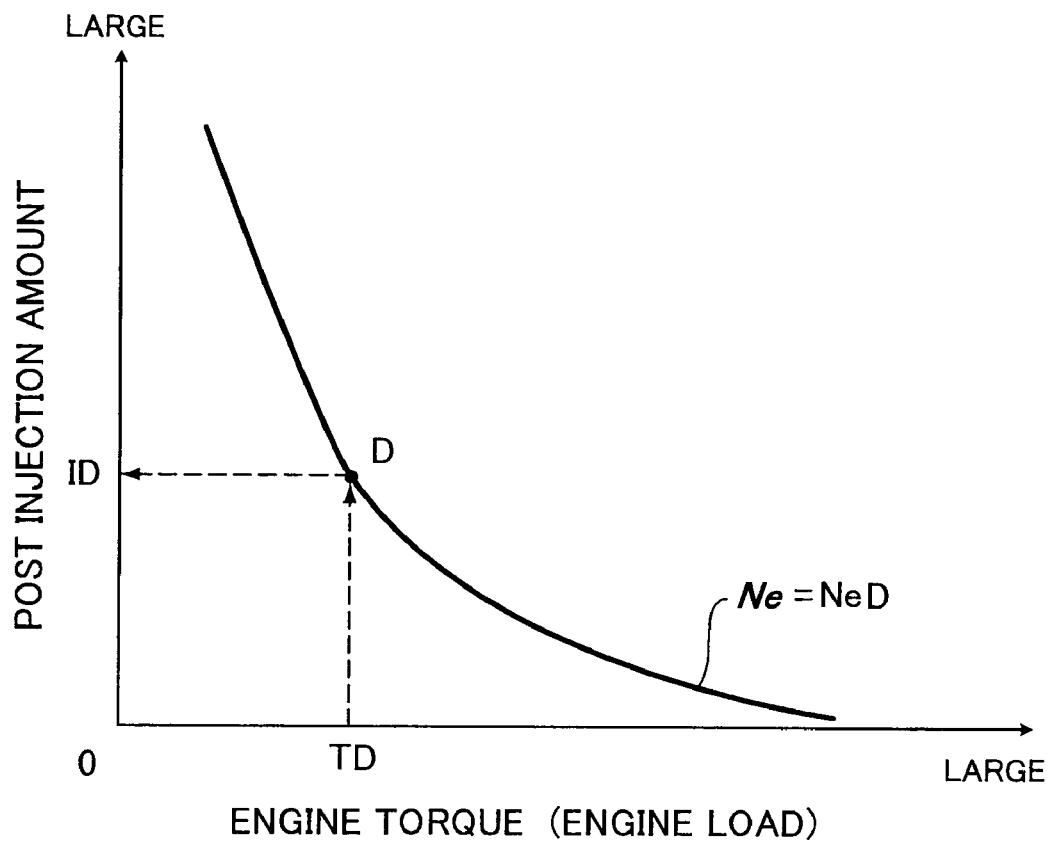
FIG. 6 is a map showing a post injection characteristic when engine rotation speed is fixed, and defines the relation between engine torque and fuel injection amount of the post injection.

The map of FIG. 6 is stored in the ROM, and defines the relation of the post injection amount ID and the engine torque under the condition that the engine rotation speed Ne is constant (in this embodiment, Ne=NeD). The post injection amount ID for the post injection is the fuel injection amount required for DPF regeneration. Since a large engine torque increases the exhaust gas temperature, the post injection amount ID decreases as the engine torque TD for the new running point D increases. The post injection amount ID relative to the engine torque TD found in the step S5, can be calculated using this map. In the step S8, post-injection is started by calculating the post-injection amount ID required for DPF regeneration based on the map of FIG. 6.

In a step S9, it is determined whether or not regeneration of the DPF has been completed. For this determination a known method may be used, for example the determination may be performed according to the differential pressure at the inlet and outlet of the DPF or the elapsed time from regeneration start. It may be determined that regeneration of the DPF has been completed when the differential pressure is less than a second predetermined value or when the elapsed time from regeneration start is greater than a predetermined time.

In a step S10, DPF regeneration end processing is performed. Specifically, post-injection is stopped. If a change of the speed ratio and the engine running point of steps S4–S7 is performed, the speed ratio is returned from the newly set speed ratio for the running point D to the original speed ratio before being changed by the steps S4–S7 (speed ratio for the running point B) and further the engine running point is returned from the running point D to the original running point B before being changed by the steps S4–S7.

The effect of the control of this embodiment on the CVT will now be described referring to the time charts of FIG. 7A–F. The solid line relates to the control of this embodiment, and the dashed line relates to the case where the control of this embodiment is not performed (where speed change control is not performed).

Figure 7A:
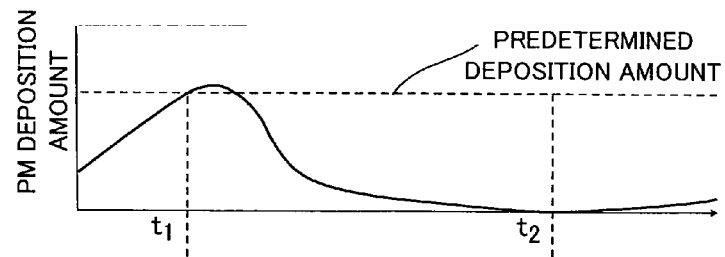
FIG. 7A shows a PM deposition amount as a function of time.
Figure 7B:
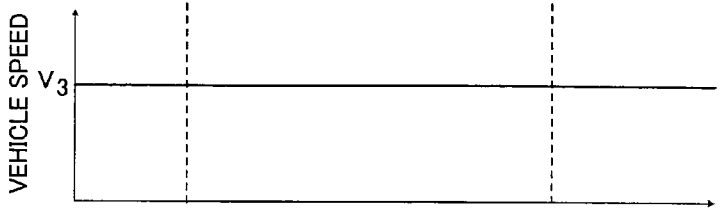
FIG. 7B shows vehicle speed as a function of time.

As shown in FIG. 7A, particulate matter (PM) is deposited with elapsed time. When the PM deposition amount exceeds a certain PM deposition amount that requires the start of regeneration, the aforesaid control is started (time t1; Step S1). When the vehicle speed is maintained constant (FIG. 7B), the transmission 30 is shifted to the Hi (low speed ratio) side so that the DPF can be regenerated (FIG. 7C; Step S7). The engine rotation speed is reduced (FIG. 7D; Step S7) by the upshift of the transmission 30. Post-injection is started (FIG. 7E; Step S8). Thus, by performing this control, the exhaust gas temperature rises to the threshold temperature Te at which DPF regeneration is possible (FIG. 7 F).

When there is no further deposition of PM (time t2 in FIG. 7A; Step S9), DPF regeneration processing is completed. The speed ratio (FIG. 7C) and engine rotation speed (FIG. 7D) are returned to their original values, post-injection is stopped (FIG. 7E), and the exhaust gas temperature is returned to its original value, i.e. the temperature immediately before the regeneration started (FIG. 7F).

Then, PM is gradually deposited again (FIG. 7A), and when the PM amount exceeds the PM deposition amount at regeneration start, the above regeneration processing is performed again.

Figure 7C:
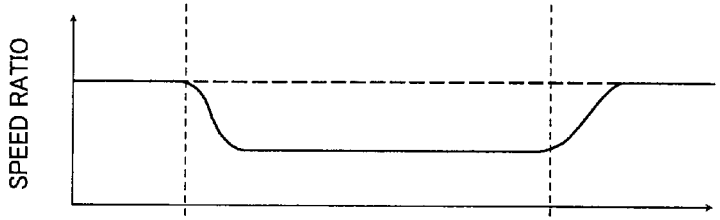
FIG. 7C shows speed ratio as a function of time.
Figure 7D:
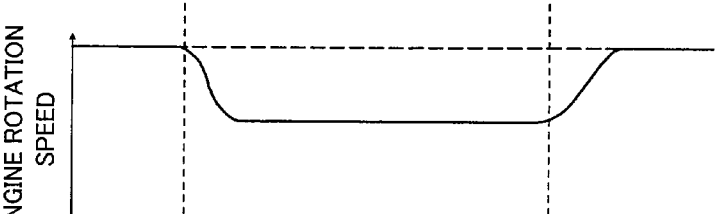
FIG. 7D shows engine rotation speed as a function of time.
Figure 7E:
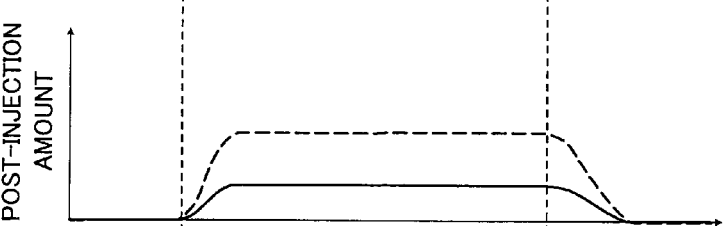
FIG. 7E shows post-injection amount as a function of time.
Figure 7F:
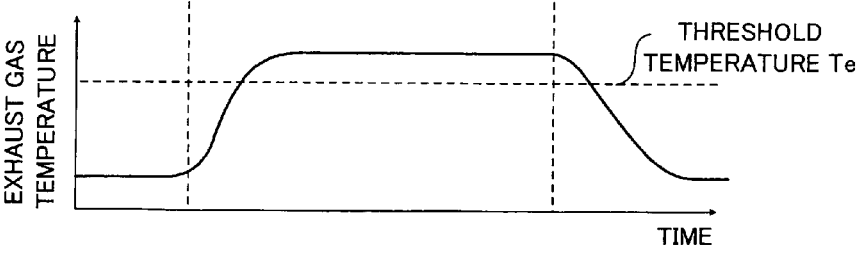
FIG. 7F shows exhaust gas temperature as a function of time.

On the other hand, in the prior art, the exhaust gas temperature may be increased to a temperature above the threshold temperature Te at which DPF regeneration is possible (FIG. 7F), while maintaining a fixed vehicle speed (FIG. 7B) and without changing the speed ratio or engine rotation speed (dashed lines of FIGS. 7C and D). For this reason, the fuel injection amount of the post-injection must be sharply increased (dashed line of FIG. 7E). If the post-injection amount is increased, fuel consumption will be impaired.

The control of this embodiment can perform filter regeneration processing by changing the running point of the engine so that the exhaust gas temperature will be high, even when the engine load is small and the exhaust gas temperature is low. In the control of this embodiment, even when performing a "post-injection" to increase the exhaust gas temperature above the threshold temperature Te in addition to change-over of the running point of the engine, the injection amount of the "post-injection" can be reduced as compared with the prior art in which the running point of the engine is not changed. In this way, the control of this embodiment has the effect of improving fuel consumption.

A second embodiment of the regeneration control of the particulate filter will now be described referring to FIG. 8 and FIG. 9. Identical symbols are assigned to parts having the same function as those of the first embodiment described above, and their description will not be repeated. The flowchart of regeneration control is the same as the flowchart of FIG. 3.

In this embodiment, in the Step S8 of the flowchart, DPF regeneration processing is performed not by post-injection but by "injection timing retardation". The controller 40 controls the fuel injector 22 to delay fuel injection timing. The retardation amount RD required for DPF regeneration is found by looking up the map of FIG. 9 according to the engine torque TD calculated in the step S5. The map of FIG. 9 is stored in the ROM, and determines the relation between the retardation amount RD of the fuel injection timing, and the engine torque Etor. The retardation amount RD decreases as the engine torque TD for the new running point D increases.

As a misfire will occur if the fuel injection timing is delayed too much (when the retardation amount is too large), there is an upper limiting value of the retardation amount. Therefore, for example, if the engine torque is TD1, and the retardation amount RD1 corresponding to the engine torque TD1 exceeds the upper limit, injection timing retardation is started after decreasing the engine torque from TD1 to TD2 and decreasing the retardation amount from RD1 to RD2.

Figure 8A:
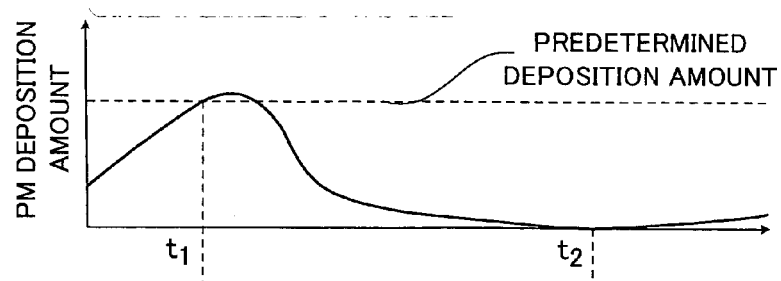
FIG. 8A shows a PM deposition amount as a function of time.
Figure 8B:
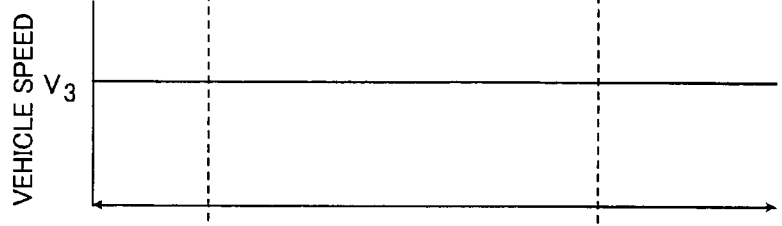
FIG. 8B shows vehicle speed as a function of time.
Figure 8C:
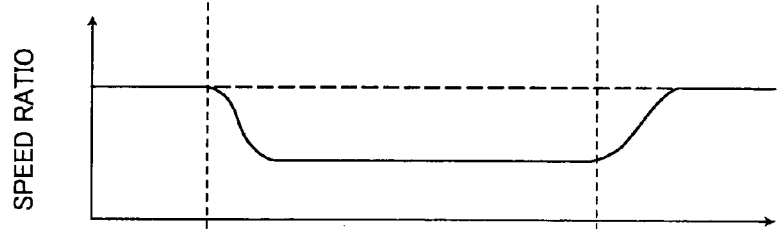
FIG. 8C shows speed ratio as a function of time.
Figure 8D:
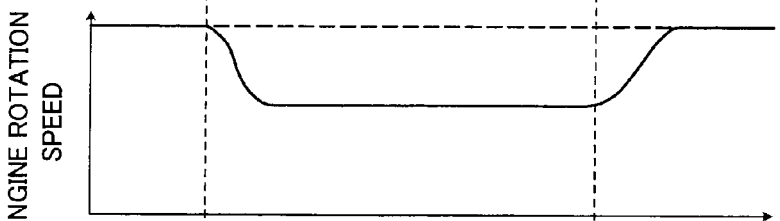
FIG. 8D shows engine rotation speed as a function of time.
Figure 8E:
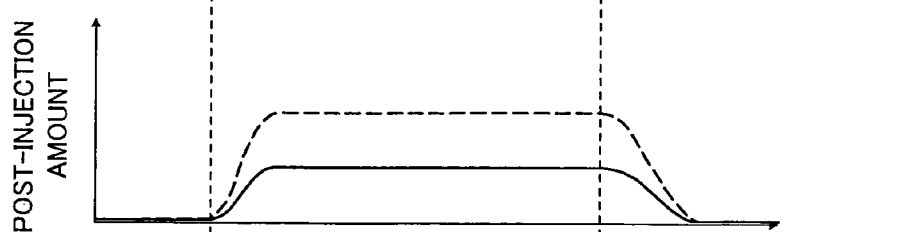
FIG. 8E shows post-injection amount as a function of time.
Figure 8F:
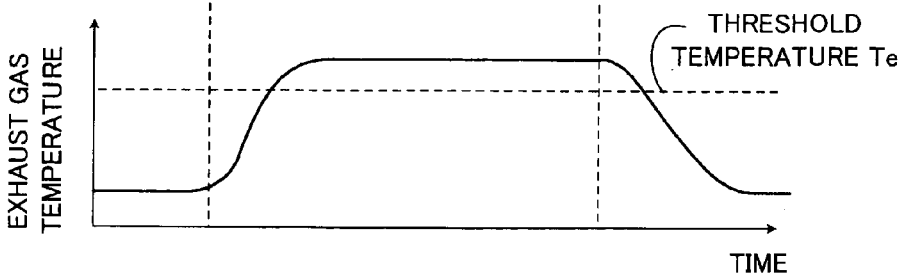
FIG. 8F shows exhaust gas temperature as a function of time.
Figure 9:
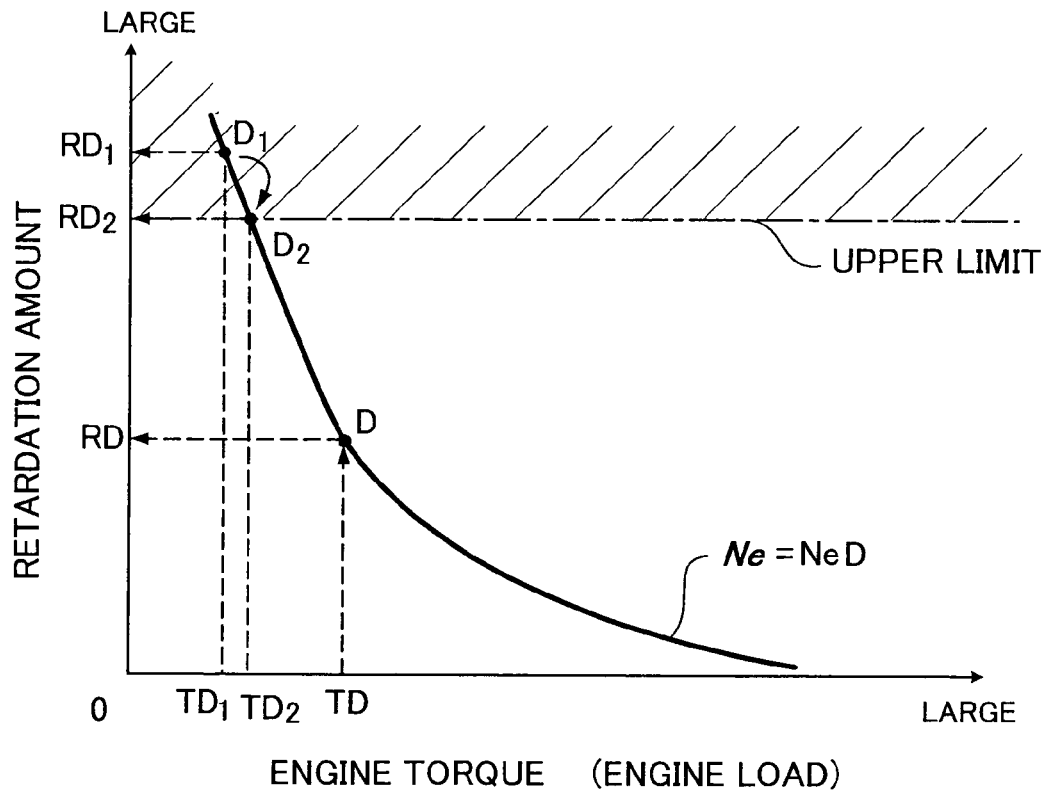
FIG. 9 is a map showing an injection timing retardation characteristic when engine rotation speed is fixed, and defines the relation between engine torque and a retardation amount.

Thus, even if the injection timing retardation is adjusted to perform DPF regeneration processing, as shown in FIG. 8E, as compared with the prior art (dashed line) in which the speed ratio of the transmission 30 and the running point of the diesel engine 20 are not modified, the retardation amount can be made small.

In this embodiment, in addition to the effect of the first embodiment, there is the additional effect that control is simple. Likewise, even when the fuel injection timing is retarded instead of performing a post-injection to raise the exhaust gas temperature to a temperature higher than the threshold temperature Te, as compared with the prior art wherein the running point of the engine is not changed, the retardation amount of the injection timing can be made small. Thus, the control of this embodiment has the effect of improving fuel consumption.

A third embodiment of the regeneration control of the particulate filter will now be described, referring to FIG. 10–12.

Although the first embodiment described the DPF regeneration control for a continuously variable transmission, this embodiment describes the DPF regeneration control for a gear transmission. The control routine is identical to that of FIG. 3.

Figure 10A:
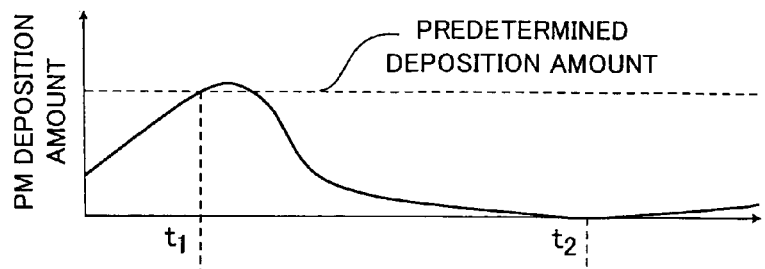
FIG. 10A shows a PM deposition amount as a function of time.
Figure 10B:
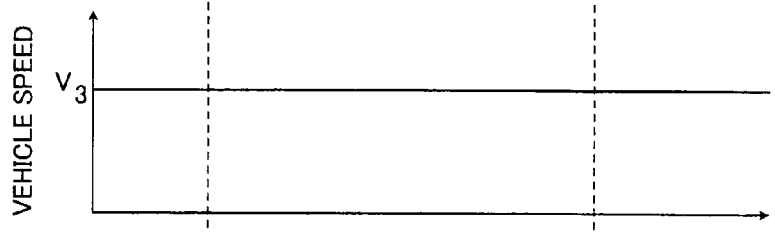
FIG. 10B shows vehicle speed as a function of time.
Figure 10C:
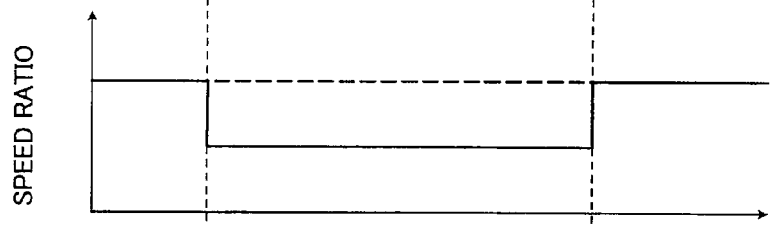
FIG. 10C shows speed ratio as a function of time.
Figure 10D:
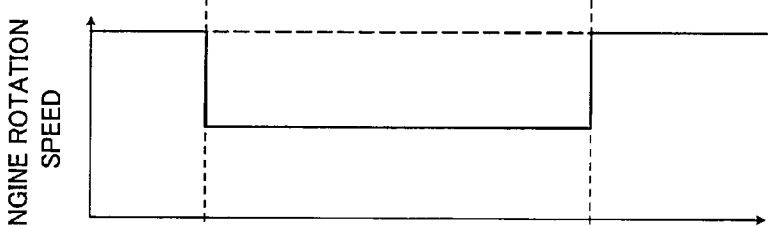
FIG. 10D shows engine rotation speed as a function of time.

As shown in FIG. 10A, PM is deposited with passing time. When the PM deposition amount exceeds a predetermined PM deposition amount that requires the start of regeneration, the control of the steps S2–S10 is started (time t1; Step S1). While the vehicle speed is fixed (FIG. 10B), the speed ratio is shifted to the Hi side (solid line of FIG. 10C; Step S7), and thus the engine rotation speed is reduced (FIG. 10D; Step S7).

Figure 11:
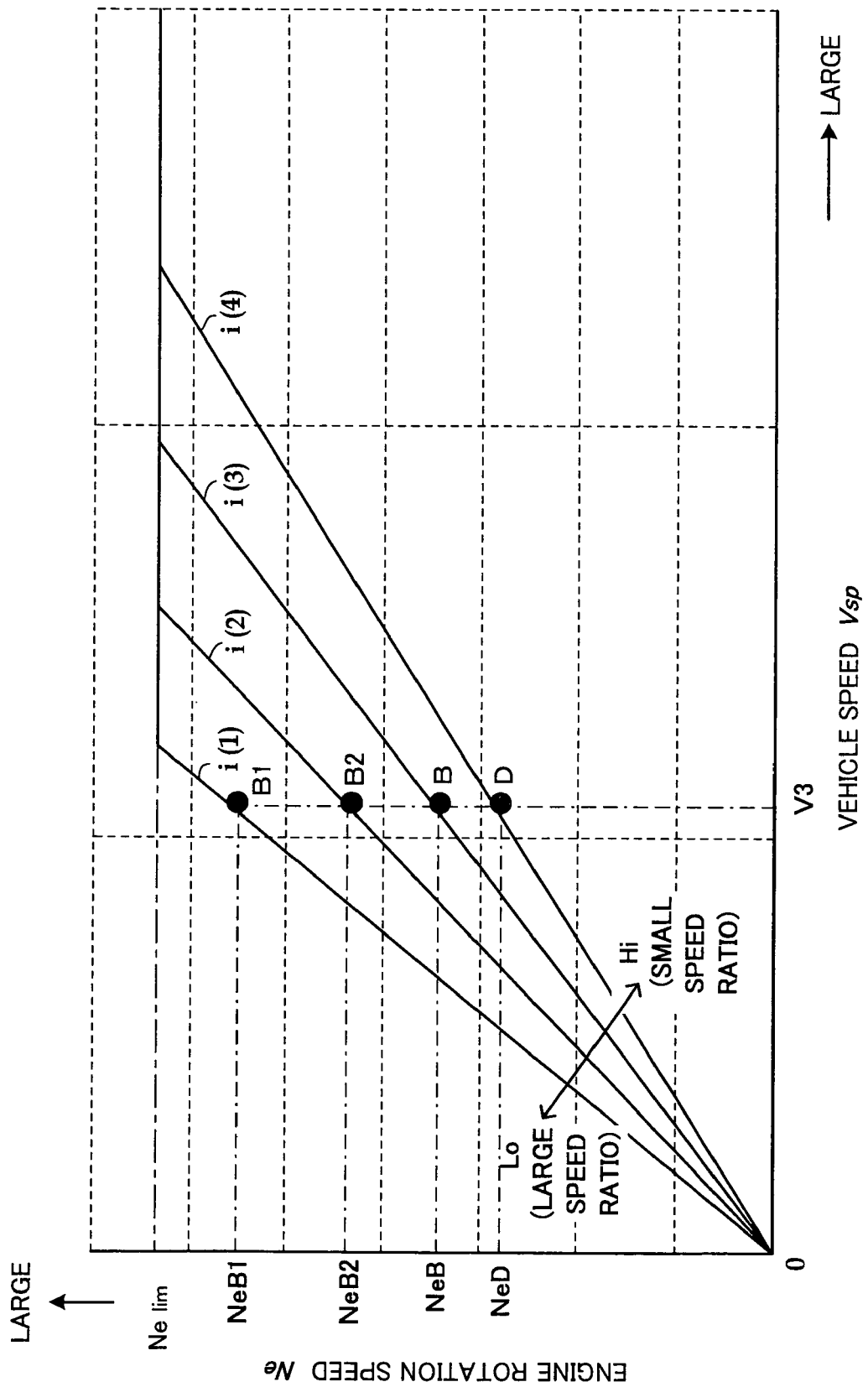
FIG. 11 is a shift map of a gear transmission.

The speed ratio and engine rotation speed are determined by looking up the shift map of FIG. 11. The shift map for a gear transmission is stored in a ROM, and the lines shows 1st gear (i(1))–4th gear(i(4)). The slope of the line on the Lo (high speed ratio) side is steep, and the slope of the line on the Hi (low speed ratio) side is gradual.

For a given vehicle speed, the running point can be selected from a maximum of four points. For example, in the case of a vehicle speed V3, it can be selected from the running point B1 of 1st gear (engine rotation speed NeB1), running point B2 of 2nd gear (engine rotation speed NeB2), running point B of 3rd gear (engine rotation speed NeB), and running point D of 4th gear (engine rotation speed NeD). These running points are plotted on the map of FIG. 12.

Figure 12:
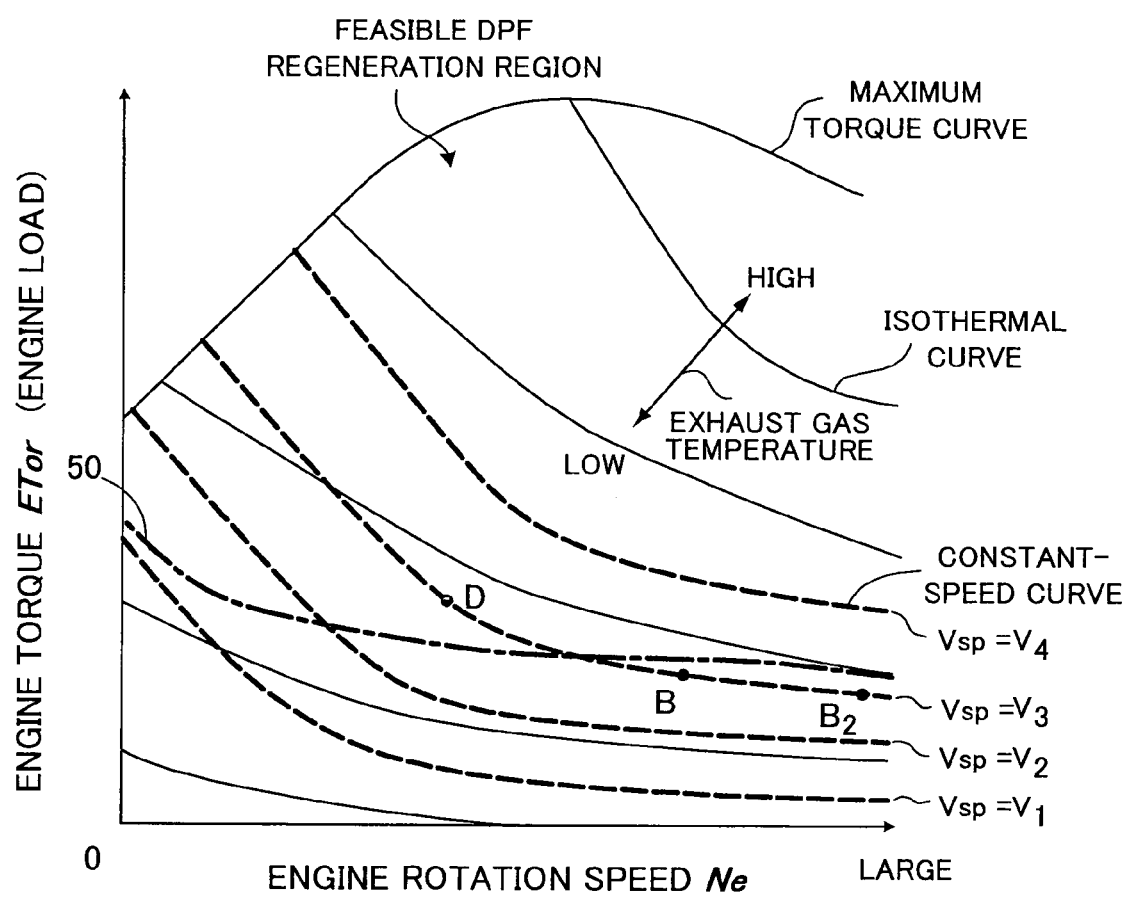
FIG. 12 is a diagram showing the running range of the diesel engine in which DPF regeneration is possible in the gear transmission, and defines the relation between engine rotation speed and engine torque for every vehicle speed.

FIG. 12 shows the engine running range in which DPF regeneration is possible within an engine rotation speed-engine torque plane in a gear transmission. The horizontal axis shows the engine rotation speed Ne, and the vertical axis shows the engine torque Etor (engine load). For a given vehicle speed, the running point can be selected from a maximum of four points. For example, at the vehicle speed V3, the running point can be selected from four running points B1 (not shown in the diagram), B2, B and D.

For example, when DPF regeneration is required while the vehicle is running at the vehicle speed V3 with the engine at the running point B (3rd gear), the engine running point is changed from the running point B (3rd gear) to the running point D (4th gear). For example, when DPF regeneration is required while the vehicle is running at the vehicle speed V3 with the engine at the running point B2 (2nd gear), the engine running point is changed from the running point B2 (2nd gear) to the running point D (4th gear). This is because the running point B of 3rd gear or the running point B2 of 2nd gear is in the difficult DPF regeneration region, and in order to run the engine at the running point D in the feasible DPF regeneration region, the gear of the transmission 30 is shifted up from 2nd gear to 4th gear.

Figure 10E:
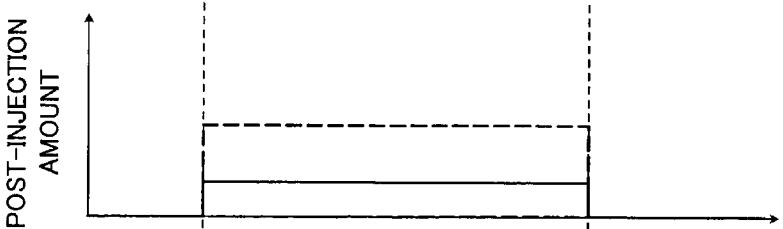
FIG. 10E shows post-injection amount as a function of time.
Figure 10F:
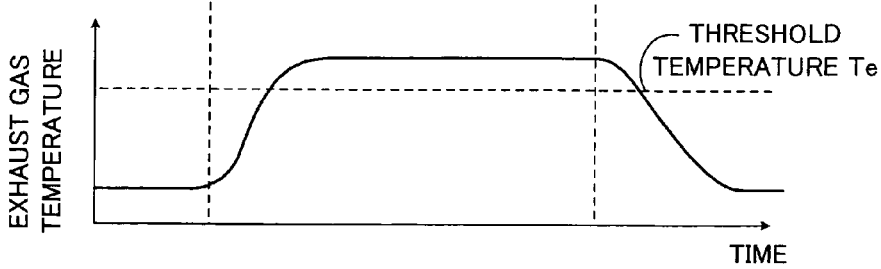
FIG. 10F shows exhaust gas temperature as a function of time.

Returning again to FIG. 10, a post-injection is performed at the speed ratio and engine rotation speed set in the steps S4–S7 (FIG. 10E; Step S8). This control can raise the exhaust gas temperature to a temperature above the threshold temperature Te at which DPF regeneration can be started (FIG. 10F).

When there is no PM deposition, (time t2 of FIG. 10A; Step S10), DPF regeneration processing is terminated. The speed ratio (FIG. 10C) and engine rotation speed (FIG. 10D) are returned to the original speed ratio (FIG. 10C) and the original engine rotation speed before being changed by the steps S4–S7. The post-injection stops (FIG. 10E), and the exhaust gas temperature is returned to the original exhaust gas temperature before being changed by the steps S8–S9.

Subsequently, as PM is gradually deposited again (FIG. 10A), when it exceeds the predetermined PM deposition amount required to start regeneration, the above-mentioned control is repeated.

On the other hand, to raise the exhaust gas temperature to a temperature higher than the threshold temperature Te at which the DPF can be regenerated (FIG. 10F) without changing the engine rotation speed (dotted lines of FIGS. 10C and D) while maintaining a fixed vehicle speed (FIG. 10B), the engine post-injection amount must be sharply increased (dashed line of FIG. 10E). Thus, if the post-injection amount is increased, fuel consumption will be impaired.

Therefore, by performing the control in this embodiment also in a gear transmission, the exhaust gas temperature can be increased to a temperature higher than the DPF regeneration temperature Te without increasing the post-injection amount largely, and therefore, fuel cost-performance can be improved.

Although the invention has been described above by reference to certain embodiments of the invention, the invention is not limited to the embodiments described above. Although in the aforesaid three embodiments, post-injection and injection timing retardation are performed together with change of running point (change of engine rotation speed and speed ratio), post-injection and injection timing retardation are not necessary if the change of the running point enables the exhaust gas temperature to increase to a temperature higher than the DPF regeneration temperature Te by itself. Further, injection timing retardation may also be performed to raise the exhaust gas temperature in a gear transmission.

Modifications and variations of the embodiment described above will occur to those skilled in the art, in light of the above teachings. The scope of the invention is defined with reference to the following claims.

The entire contents of Japanese Patent Application P2003-1347 (filed Jan. 7, 2003) are incorporated herein by reference.

What is claimed is:

1. A regeneration device for a diesel particulate filter which traps particulates in exhaust gas discharged from a vehicle diesel engine, wherein the diesel engine outputs an engine torque through an automatic transmission to drive wheels; the regeneration device comprising:
   a condition detecting sensor which detects a condition of the diesel particulate filter; and
   a controller which stores a map defining a predetermined running region of a diesel engine in which self-ignition of trapped particulates is possible, the controller being programmed to:
      determine whether or not regeneration of the filter is required based on the detected condition;
      modify a running point of the diesel engine to a point within the predetermined running region from a point outside the predetermined running region, when the regeneration of the filter is required;
      set a target speed ratio of the automatic transmission based on an engine rotation speed at the modified running point; and
      control a speed ratio of the automatic transmission to the target speed ratio.

2. The regeneration device as defined in claim 1, further comprising a vehicle speed sensor which detects a vehicle speed, and
   wherein the controller is programmed to read the vehicle speed from the vehicle speed sensor; modify the running point of the diesel engine to a point which lies within the predetermined running region and which maintains the vehicle speed; and set the target speed ratio of the automatic transmission based on the read vehicle speed and the engine rotation speed at the modified running point.

3. The regeneration device as defined in claim 1, wherein the controller is programmed to control the automatic transmission to the target speed ratio by performing an upshift of the automatic transmission.

4. The regeneration device as defined in claim 1, wherein the controller is further programmed to determine whether or not the regeneration of the filter is complete, and when the regeneration of the filter is complete, return the running point of the diesel engine to a running point prior to the modification.

5. The regeneration device as defined in claim 1, further comprising a fuel injector of the diesel engine,
   wherein the controller is further programmed to control the fuel injector to perform a post-injection after controlling the speed ratio of the automatic transmission to the target speed ratio, wherein the post-injection is another fuel injection following an ordinary fuel injection.

6. The regeneration device as defined in claim 1, further comprising a fuel injector of a diesel engine,
   wherein the controller is further programmed to control the fuel injector to delay injection timing after controlling the speed ratio of the automatic transmission to the target speed ratio.

7. The regeneration device as defined in claim 1, wherein the condition detecting sensor is a differential pressure sensor which detects a differential pressure between an inlet pressure and an outlet pressure of the filter; and
   wherein the controller is further programmed to determine that regeneration of the filter is required when the differential pressure is larger than a predetermined value.

8. A regeneration device for a diesel particulate filter which traps particulates in exhaust gas discharged from a vehicle diesel engine, wherein the diesel engine outputs an engine torque through an automatic transmission to drive wheels; the regeneration device comprising:
   means for storing a map defining a predetermined running region of a diesel engine in which self-ignition of trapped particulates is possible;
   means for detecting a condition of the diesel particulate filter;
   means for determining whether or not regeneration of the filter is required based on the condition of the filter;
   means for modifying a running point of the diesel engine to a point within the predetermined running region from a point outside the predetermined running region, when the regeneration of the filter is required;
   means for setting a target speed ratio of the automatic transmission based on an engine rotation speed at the modified running point; and
   means for controlling a speed ratio of the automatic transmission to the target speed ratio.

9. The regeneration device as defined in claim 8, further comprising means for detecting a vehicle speed,
   wherein said means for modifying a running point comprises means for modifying the running point of the diesel engine to a point which lies within the predetermined running region and which maintains the vehicle speed,
   and wherein said means for setting a target speed ratio comprises means for setting a target speed ratio of the automatic transmission based on the detected vehicle speed and the engine rotation speed at the modified running point.

10. A regeneration method for regenerating a diesel particulate filter which traps particulates in exhaust gas discharged from a vehicle diesel engine, wherein the diesel engine outputs an engine torque through an automatic transmission to drive wheels; the regeneration method comprising the steps of:
    storing a map defining a predetermined running region of a diesel engine in which self-ignition of trapped particulates is possible;
    detecting a condition of the diesel particulate filter;
    determining whether or not regeneration of the filter is required based on the detected condition;
    modifying a running point of the diesel engine to a point within the predetermined running region from a point outside the predetermined running region, when the regeneration of the filter is required;
    setting a target speed ratio of the automatic transmission based on an engine rotation speed at the modified running point; and
    controlling a speed ratio of the automatic transmission to the target speed ratio.

11. The regeneration method as defined in claim 10, further comprising a step of detecting a vehicle speed,
    wherein said step of modifying a running point comprises modifying the running point of the diesel engine to a point which lies within the predetermined running region and which maintains the vehicle speed,
    and wherein said step of setting a target speed ratio comprises setting a target speed ratio of the automatic transmission based on the detected vehicle speed and the engine rotation speed at the modified running point.

12. A regeneration device for a diesel particulate filter which traps particulates in exhaust gas discharged from a vehicle diesel engine, wherein the diesel engine outputs an engine torque to an automatic transmission; the automatic transmission converts the engine torque to a drive torque transmitted to drive wheels; and the diesel particulate filter is installed in a diesel engine exhaust gas system; the regeneration device comprising:

a condition detecting sensor which detects a condition of the diesel particulate filter, a vehicle speed sensor which detects a vehicle speed, and a controller which stores a map defining a predetermined running region of a diesel engine in which regeneration of the filter is possible, the controller being programmed to:

read the vehicle speed from the vehicle speed sensor;

determine whether or not regeneration of the filter is required based on the condition of the filter detected by the condition detecting sensor;

when the regeneration of the filter is required, modify a running point of the diesel engine to a running point which maintains the vehicle speed and which lies within the predetermined running region from a running point outside the predetermined running region;

set a target speed ratio of the automatic transmission based on the maintained vehicle speed and an engine rotation speed at the modified running point;

control the diesel engine to realize the engine rotation speed at the modified running point; and control a speed ratio of the automatic transmission to the target speed ratio.

13. A regeneration device for a diesel particulate filter which traps particulates in exhaust gas discharged from a vehicle diesel engine, wherein the diesel engine outputs an engine torque through an automatic transmission to drive wheels; the regeneration device comprising:

a condition detecting sensor which detects a condition of the diesel particulate filter;

a controller which stores a map defining a predetermined running region of a diesel engine in which self-ignition of trapped particulates is possible, the controller being programmed to:

determine whether or not regeneration of the filter is required based on the detected condition;

modify a running point of the diesel engine to a point within the predetermined running region when the regeneration of the filter is required;

set a target speed ratio of the automatic transmission based on an engine rotation speed at the modified running point; and control a speed ratio of the automatic transmission to the target speed ratio;

and further comprising a fuel injector of the diesel engine;

wherein the controller is further programmed to control the fuel injector to perform a post-injection after controlling the speed ratio of the automatic transmission to the target speed ratio, wherein the post-injection is another fuel injection following an ordinary fuel injection.

14. A regeneration device for a diesel particulate filter which traps particulates in exhaust gas discharged from a vehicle diesel engine, wherein the diesel engine outputs an engine torque through an automatic transmission to drive wheels; the regeneration device comprising:

a condition detecting sensor which detects a condition of the diesel particulate filter;

a controller which stores a map defining a predetermined running region of a diesel engine in which self-ignition of trapped particulates is possible, the controller being programmed to:

determine whether or not regeneration of the filter is required based on the detected condition;

modify a running point of the diesel engine to a point within the predetermined running region when the regeneration of the filter is required;

set a target speed ratio of the automatic transmission based on an engine rotation speed at the modified running point; and control a speed ratio of the automatic transmission to the target speed ratio; and further comprising a fuel injector of the diesel engine;

wherein the controller is further programmed to control the fuel injector to delay injection timing after controlling the speed ratio of the automatic transmission to the target speed ratio.

15. A regeneration device for a diesel particulate filter which traps particulates in exhaust gas discharged from a vehicle diesel engine, wherein the diesel engine outputs an engine torque through an automatic transmission to drive wheels; the regeneration device comprising:

a condition detecting sensor which detects a condition of the diesel particulate filter; and a controller which stores a map defining a predetermined running region of a diesel engine in which self-ignition of trapped particulates is possible, the controller being programmed to:

determine whether or not regeneration of the filter is required based on the detected condition;

modify a running point of the diesel engine to a point within the predetermined running region when the regeneration of the filter is required;

set a target speed ratio of the automatic transmission based on an engine rotation speed at the modified running point; and control a speed ratio of the automatic transmission to the target speed ratio;

wherein the condition detecting sensor is a differential pressure sensor which detects a differential pressure between an inlet pressure and an outlet pressure of the filter; and wherein the controller is further programmed to determine that regeneration of the filter is required when the differential pressure is larger than a predetermined value.

* * * * *